United States Patent [19]

Chiba et al.

[11] 4,166,662

[45] Sep. 4, 1979

[54] SHELL TYPE RACE FOR THRUST ROLLER BEARING

[75] Inventors: Moichi Chiba, Yokosuka; Hideo Ouchi, Sagamihara; Toshio Suzuki, Chigasaki, all of Japan

[73] Assignee: The Torrington Company, Torrington, Conn.

[21] Appl. No.: 896,975

[22] Filed: Apr. 17, 1978

[30] Foreign Application Priority Data

May 10, 1977 [JP] Japan .............................. 52-58303[U]

[51] Int. Cl.² .......................................... F16C 33/58
[52] U.S. Cl. .................................... 308/235; 308/236
[58] Field of Search .............. 308/235, 236, 227–231, 308/219, 174, 35

[56] References Cited

U.S. PATENT DOCUMENTS

| 3,341,263 | 9/1967 | Pitner | 308/231 X |
| 3,920,292 | 11/1975 | Haussels | 308/174 |
| 3,930,692 | 1/1976 | Condon, Jr. et al. | 308/174 |
| 3,972,574 | 8/1976 | Pitner | 308/235 |
| 3,999,816 | 12/1976 | Pitner | 308/235 X |

Primary Examiner—Douglas C. Butler
Attorney, Agent, or Firm—Frank S. Troidl

[57] ABSTRACT

In a shell type race for a thrust roller bearing comprising at least a planar race wall on which rollers may roll, and an axially extending, cyclindrical wall adapted to be inserted and located in a housing, the outer surface of the cylindrical wall has a plurality of resilient tongues projecting outwardly so as to be open toward the race wall.

1 Claim, 1 Drawing Figure

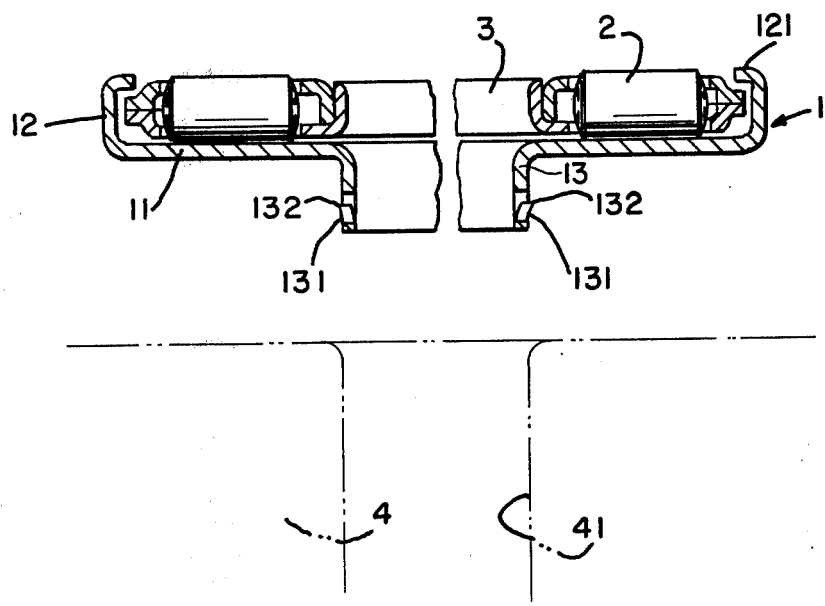

SHELL TYPE RACE FOR THRUST ROLLER BEARING

This invention relates to a shell type race for a thrust roller bearing, and more particularly to improvements in such race whereby said thrust race may be accurately located in an opening in a housing and may not readily slip out.

In some mechanical assemblies using thrust bearings it is often necessary to accurately and positively hold the bearing or the race with respect to a housing prior to the bearing being finally assembled.

It is an object of the present invention to provide a shell type race (formed of sheet material such as iron sheet or the like) for a thrust roller bearing which is effective for the above-described assembly of bearings.

According to the present invention, the shell type race for a thrust roller bearing comprises at least a planar race on which rollers may roll, and an axially extending, cylindrical wall adapted to be inserted and located in a housing, the outside surface of the cylindrical wall having a plurality of resilient tongues projecting outwardly so as to be open toward the race wall. The end edges of the resilient tongues on the cylindrical wall of the race may be formed so as to bite into the wall of an opening in the housing. An outer peripheral wall for guiding a retainer may be provided on the outer periphery side of the race wall. The outer peripheral wall for guiding the retainer may be formed with a restraining portion engageable with the outer peripheral edge portion of the retainer to prevent the retainer from slipping out.

The invention will become more fully apparent from the following detailed description of an embodiment thereof taken in conjunction with the accompanying FIGURE which is an exploded view showing a housing for holding the bearing and a vertical cross-sectional view of a thrust roller bearing having the shell type race of the present invention.

Referring to the embodiment of the present invention shown in the Figure, there is seen the shell type race 1 according to the present invention, rollers 2, a retainer 3 for holding and guiding the rollers 2, and a housing 4.

The race 1 is formed with a substantially C-shaped cross-section having an axially extending, outer peripheral wall 12 on the outer periphery side of a race wall 11 on which the rollers may roll and having an axially extending, cylindrical wall 13 on the inner periphery side which may be inserted and located in an opening 41 in the housing 4. The cylindrical wall 13 has an outside diameter substantially equal to or slightly less than the inside diameter of the opening 41 of the housing, and the outer surface of the cylindrical wall 13 is formed with a plurality of resilient tongues 131—131 projecting outwardly so as to be open toward the race wall 11.

Particularly, the resilient tongues 131 in the present embodiment are constructed such that the end edges 132 thereof bite into the peripheral wall of the opening 41 of the housing to positively prevent the retainer from slipping out of the housing.

Further, in the present embodiment, the edge portion of the outer peripheral wall 12 is formed into a restraining portion 121 inwardly extending beyond the outer peripheral edge of the retainer 3.

In the shell type race for a thrust roller bearing according to the present invention, as has hitherto been described, the outer surface of the inner peripheral wall which is to mate with the bearing holding opening of the housing is particularly formed with resilient tongues projecting outwardly so as to face the race wall side, so that the cylindrical wall may of course be readily inserted into the housing (in the direction of the arrow) without being interfered with by these resilient tongues and, once inserted, the resilient tongues on the inner peripheral wall are resiliently engaged with the wall of the opening to thereby completely eliminate the risk of the race slipping out during handling.

Particularly, the present invention is of such construction that the fixing force with respect to the housing is provided chiefly by the above-described resilient tongues and, therefore, the cylindrical wall 13 is sufficient if it only serves the function of locating the thrust bearing in the housing. Thus, the cylindrical wall is only required to have such a dimension of fit that will prevent radial deviation of the race and the risk of the race being deformed during its insertion is eliminated, while the insertion becomes correspondingly easier.

Further, by forming the resilient tongues such that the end edges thereof bite into the wall of the opening in the housing as in the shown embodiment, the fixing of the race with respect to the housing will be more rigid.

It should be understood that the shell type race of the present invention is not restricted to the illustrated embodiment, but the configuration of the race and the configuration, number, and locations of the resilient tongues may be suitably changed in performing the invention.

We claim:

1. A shell type race for a thrust roller retainer comprising at least a planar race wall on which rollers in the retainer may roll, and an outer peripheral wall for guiding the retainer is formed with a restraining portion engageable with the outer peripheral edge portion of said retainer to prevent said retainer from slipping out and an axially extending, cylindrical wall is adapted to be inserted and located in an opening in a housing, the outer surface of said cylindrical wall having a plurality of individual resilient tongues projecting outwardly so as to be open toward said race wall with the end edge of said individual resilient tongues on said cylindrical wall of said race formed so as to bite into the wall formed by said opening in said housing.

* * * * *